Oct. 17, 1967     H. W. TEMPLETON     3,347,576

PRELOADED PIVOT JOINT

Filed July 13, 1965

INVENTOR.

HERBERT W. TEMPLETON

ATTORNEYS

United States Patent Office 3,347,576
Patented Oct. 17, 1967

3,347,576
PRELOADED PIVOT JOINT
Herbert W. Templeton, Southfield, Mich., assignor to TRW Inc., Cleveland, Ohio, a corporation of Ohio
Filed July 13, 1965, Ser. No. 471,596
4 Claims. (Cl. 287—90)

ABSTRACT OF THE DISCLOSURE

A pin joint for automotive steering linkages and the like with a stud having a head shaped to accommodate rotation of the stud about its own axis which is recessed in the end thereof and has an annular rim surrounding the recess. A socket surrounds a rigid but somewhat deformable plastic bearing block which envelops the head. The recess of the head receives a rigid but somewhat compressible plug. A closure member for the socket deforms both the plug and the bearing block into conformity therewith and with the socket and head while flowing plug and bearing material over the rim of the head. Lubricant is trapped between the head and bearing block and between the head and plug to facilitate rotation of the stud in the socket. Deformability of the bearing and plug materials will also accommodate slight tilting movements of the stud relative to the socket. The turning torque of the stud, relative to the socket, is controlled by the loading of the plastic materials in the socket and remains constant during the life of the joint.

---

This invention relates to a pin type joint assembly useful where rotation with minimum angular oscillation is desirable for stability. Specifically, this invention deals with a pivot joint with a headed pin or stud rotatably supported in a socket carried plastic bearing and receiving a compression plug therein in which a closure member for the socket axially loads both the bearing and plug into conformity therewith and with the stud head to seal lubricant between the plug and stud and between the stud and bearing while simultaneously controlling the turning torque of the joint.

The invention will hereinafter be described as embodied in a pin joint for automotive steering linkages, but it is to be understood that the joints of this invention are generally applicable for use in any linkage where relative rotation with slight oscillation is desirable.

In the preferred embodiment of the invention, a socket is provided with a tapered bore into which is press fitted a stud and bearing assembly. The stud is in the form of a metal pin with a generally cylindrical shank and an enlarged head with an open bottom recess. The bearing mates with the head and a plug is inserted in the recess. A concave closure disk is spun into the open bottom of the socket to close the same and loads both the bearing and plug axially while deforming the same into conformity therewith and with the adjacent head areas of the stud. The deformed portions serve to provide seals for trapping lubricant between the stud head, plug and bearing.

A feature of the invention is the utilization of a compression plug loaded by a closure disk for a joint socket to produce a pin joint with a relatively constant turning torque regardless of variations in sizes of the joint components thereby accommodating wide manufacturing tolerances.

Another feature of the invention is the use of a joint closure plug to simultaneously load and deform plastic bearings for a pivot joint into conformity with both the plug and joint stud thereby sealing grease between the stud and plastic.

The plastic bearing and plug for the joints of this invention are preferably composed of elastomeric but rigid material. Both the plug and bearing are preformed and have relatively high densities but are sufficiently deformable to conform with the stud, socket and closure plug contours when axially loaded. The materials have some degree of compressibility so as to retain compressive stresses that store up energy for release as wear develops during use of the joint and to maintain the constant turning torque for the joint. The deformability of the materials will accommodate slight tilting movement of the pin relative to the socket.

Preferred materials for the bearing and plug are high density ethylene copolymers such as "Marlex" sold by Philips Chemical Company; "Alathon" sold by Du Pont and "Forti-Flex" sold by Celanese Plastics Company.

It is then an object of this invention to provide a pin type joint of constant turning torque controlled by a compression loaded plug.

Another object of the invention is to provide a compression loaded pin joint wherein a closure plug axially loads and deforms the joint bearings to control the turning torque and to sail lubricant in the joint.

The specific object of this invention is to provide a pin joint for steering linkages wherein an inexpensively formed cold headed metal stud receives a preformed high density ethylene copolymer plastic bearing block therearound and has a recess receiving a compression plug of the same material as the bearing block and wherein a closure plate axially loads the plastic materials in a socket into conformity therewith and with the stud to control the turning torque of the stud while sealing lubricant between the stud and plastic.

Other and further objects of this invention will be apparent to those skilled in this art from the following detailed description of the annexed sheet of drawings, by way of a preferred example, illustrates one embodiment of the invention.

Figure 1:
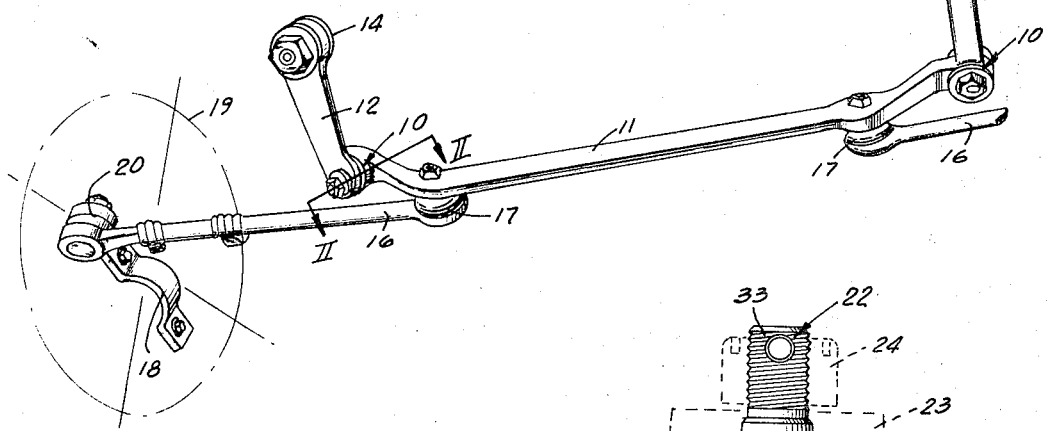
FIGURE 1 is a fragmentary isometric view of a steering linkage utilizing pin joints of this invention.

In FIGURE 1 the pin joints 10 of this invention are illustrated as supporting the ends of a cross link 11 of a parallelogram automotive steering linkage. One joint 10 pivotally connects one end of the cross link 11 with a pitman arm 12. A second pivot joint 10 of this invention pivotally connects the other end of the cross link 11 with an idler arm 13. The pitman arm 12 is pivotally suspended at 14 from the steering gear of the automotive vehicle (not shown) while the idler arm 13 is pivotally suspended at 15 from a bracket B mounted on the frame of the vehicle. Swinging of the pitman arm 12 about its pivot 14 will oscillate the cross link 11 endwise. Tie rods 16 are connected to the cross link inwardly from the ends thereof through conventional ball and socket joints 17. The endwise movement of the cross link 11 is imparted to these tie rods through the ball and socket joints, while at the same time, the joints accommodate up and down movements of the tie rods imparted thereto by the wheels of the vehicle. As shown, the tie rods are connected to the steering arms such as 18 of the vehicle wheel 19 by means of a ball and socket joint 20. Endwise movement of the tie rods 16 push and pull the wheel arms such as 18 to pivot the wheels such as 19 about their suspension axis thereby steering the vehicle.

Forces acting on the wheels such as 19 through the tie rods 16, induce component forces on the cross link 11 causing it to roll fore and aft and thereby imparting an undesirable toe-in change in the wheel alignment. The joints 10 of this invention prevent this roll of the cross link by providing stable pivots supporting the ends of the cross link and by imparting a relatively constant turning torque for the end shifting of the cross link in response to steering impulses.

Figure 2:
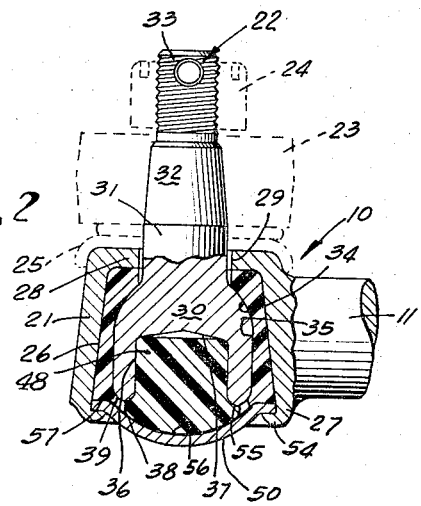
FIGURE 2 is a cross sectional view, taken generally along the line II—II of FIGURE 1 showing one of the joints of this invention, with parts in elevation and connecting parts in dotted lines.

As shown in FIGURE 2, the joints 10 of this invention include a socket 21 on the end of the cross link 11, either integral with the link or mounted on the link, and a pin or stud 22 projecting from the socket. The idler arm 13 and pitman arm 12 have eye ends 23 to which the stud 22 is fixedly wedged by means of a lock nut 24. A dust cap 25 is disposed between the eye 23 and the socket 21.

The joint socket 21 has a tapered bore 26 converging from a large bottom end 27 to a radial inturned small top end 28 having an aperture 29 therethrough.

The stud 22 has a head 30 disposed in the socket 21 and a generally cylindrical shank 31 extending from the head through the aperture 29. The cylindrical stud 31 has a tapered portion 32 wedge fitted in the tapered bore of the eye 23 and also has a threaded end portion 33 on which the lock nut 24 is threaded.

The head 30 of the stud 22 has a fragmental spherical portion 34 diverging from the cylindrical shank 31 to an elongated cylindrical portion 35.

A cylindrical recess or cavity 36 is provided in the head 30 extending inwardly from the bottom end of the head to a depth within the cylindrical portion 35 of the head thus terminating short of the spherical portion 34. The bottom of the recess 36 is preferably concave as illustrated at 37.

Figure 4:
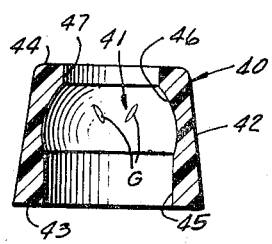
FIGURE 4 is a vertical cross sectional view of the plastic bearing for the pin joint of this invention.

The rim end of the head 30 surrounding the cavity 36 is double beveled with an outwardly flared mouth 38 and with an inwardly curved surrounding periphery 39. A plastic bearing block 40 molded to the shape shown in FIGURE 4 and preferably composed of a high density linear ethylene copolymer has an open ended central cavity 41 receiving the head 30 of the stud and a conical side wall 42 press fitted in the bore 26 of the socket. The bearing in its free molded state has a flat bottom rim 43 at the large end thereof and a flat top end wall or flange 44 at the small end thereof. The cavity 41 includes a straight cylindrical bore 45 extending upwardly from the flat end rim 43 to a fragmental spherical portion 46 starting about midway between the top and bottom of the bearing. The spherical portion 46 converges to a cylindrical aperture 47 in the small end 44 of the bearing.

The bearing 40 is thickest at the bottom end 43 thereof and thinnest at the midpoint of the spherical cavity 46.

Figure 3:
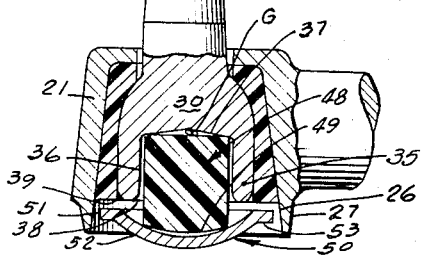
FIGURE 3 is a cross sectinal view, with parts in elevation, of the joint components assembled for pre-loading in the socket.

A plastic plug 48 preferably of the same material as the bearing 40 is seated in the recess 36 of the stud head 30. As shown in FIGURE 3, in its free state, the plug 48 is cylindrical and of slightly less diameter than the recess 36 but longer than the depth of the recess so that when it is bottomed on the wall 37 of the recess, it will extend well beyond the stud head 30. The extended end 48 of the plug is preferably domed or rounded as at 49.

The socket 21 is closed by a closure disk 50 which, as shown in FIGURE 3, has a circular outer periphery 51 of smaller diameter than the large end of the bore 26 so as to fit freely in the larger end 27 of the socket. The disk 50 has a fragmental spherical central portion 52 providing a concave recess confronting the plug 48 which recess is surrounded by a radial rim 53.

As shown in FIGURE 3, the free state height of the assembled joint components in the socket 21 is substantially greater than the assembled height shown in FIGURE 2.

To assemble the joint components, the bearing 40 receives several daubs of grease G in the recess portion 46 thereof while similar daubs are inserted in the bottom of the stud head recess 36. The stud is then pressed into the bearing with the cylindrical shank 31 extending freely through the bearing aperture 47 and the spherical head portion 34 seated in the bearing cavity 46 with a grease film trapped between the stud and bearing in this cavity. The cylindrical head portion 35 is snugly seated in the cylindrical bore 45 of the bearing. The stud and bearing thereon are then dropped into the large end 27 of the socket 21 with the stud shank extending freely through the aperture 29 of the opposite end 28. The taper 42 of the bearing 40 mates with the tapered bore 26 of the socket to provide a press wedge fit and the end wall 44 of the bearing is bottomed on the end wall 28 of the socket. When the bearing is thus bottomed in the socket, the rim end of the stud head and the rim end 43 of the bearing will be generally adjacent, preferably substantially flush, with each other and inwardly from the bottom of the socket as illustrated in FIGURE 3. The plug 48 is then dropped in the recess 36 trapping the grease in the bottom of the recess and the closure disk 50 is applied over the plug as shown in FIGURE 3. The disk 50 is then forced into the socket under a predetermined load which deforms the plug from the free state shown in FIGURE 3 to the configuration shown in FIGURE 2 and to also cause the rim 53 of the disk to deform the end 43 of the bearing as shown in FIGURE 2. When the desired load has been applied to the disk 50, the end 27 of the socket is spun over the periphery 53 of the disk as shown at 54 in FIGURE 2 to provide a retaining shoulder securing the disk in the socket.

The plug 48, under the axial load from the closure disk 50, is deformed into conformity with the cylindrical recess 36 and with the spherical recess provided by the central portion 52 of the closure disk. This traps the grease in the bottom of the recess 36 and forms an outturned bead 55 conforming in shape with the flared mouth 38 of the recess 36 and providing an enlarged spherical bottomed head 56 between the disk 50 and the rim end of the head. At the same time, the end 43 of the bearing is deformed by the periphery 53 of the disk 50 into conformity with the beveled rim 39 of the stud head, thereby forming an inturned lip 57 between the closure disk and stud head. This lip 57 is effective to seal lubricant in the cavity of the bearing while the bead 55 is also effective to seal lubricant in the recess 36 of the stud head.

It will be noted from FIGURE 3 that the disk 50 can extend into the bore 26 of the socket for a considerable distance before engaging the socket wall. Thus, even though the uncompressed stacked height of the joint components may vary considerably, the same axial load can be applied through the closure disk 50 to load the parts to the same magnitude even though tolerances of the parts may vary greatly. A predetermined axial load is thus applied to all of the joints resulting in the same turning torque for the joint regardless of variations in component sizes.

Figure 5:
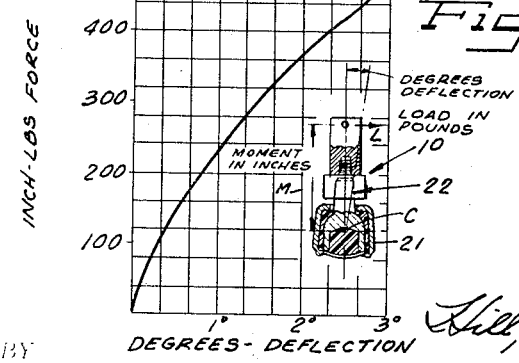
FIGURE 5 is a diagrammatic view of a pin joint of this invention and a load deflection graph for the joints of this invention.

As shown in FIGURE 5, the joints of this invention have a very high resistance to angular deflection although the stud can tilt in the socket to accommodate misalignments such as might be encountered in the steering linkage of FIGURE 1. Thus, when the stud 22 is angularly deflected within the range illustrated in FIGURE 5, it must tilt about the center C in the socket 21 and the tilting moment is illustrated at M when the load is applied at L. The graph then illustrates the number of inch pounds of force (load × distance) required to bring about angular deflection. It will thus be seen that a 2° angular deflection requires a force of almost 400 inch pounds. This provides the highly desired stability for the cross link 11 and eliminates the problems heretofore encountered by fore and aft rolling of the cross link.

The axially loaded plug and bearing in the joints of this invention retain compressive stresses which are released as wear develops during use of the joint so that turning torque remains relatively constant throughout a long wear life. In practical installation of automotive steering linkages, turning torques of between 20 and 60 inch pounds are highly satisfactory, but it is more significant that a smooth consistent torque be maintained throughout the useful life of any linkage containing the joints of this invention. It will, of course, be appreciated that the compressibility loaded plug and bearing holds the stud for rotation about a fixed center and even if deflection should occur, as illustrated in FIGURE 5, the turning center will remain constant.

The pins or studs 22 for the joints of this invention are conveniently formed by cold heading of steel rods with the hollow cylindrical ends of the stud heads being formed by backward extrusion in this cold heading process. The beveled rim ends of the stud heads can be free flow results of the backward extrusion, but it is preferred that the beveled end 39 around the O.D. of the rim be controlled to a specified radius so that the lip 57 of the bearing will be of standard size and shape to stabilize the pivot socket.

From the above descriptions, it will, therefore, be understood that this invention provides a pivot joint or pin joint with constant turning torque and fixed turning axes regardless of wide variations in component sizes by compressibly loading rigid, but somewhat elastomeric, bearings in a socket. It will be also understood that the pin joints of this invention have wear takeup capacity and yet do not require the use of takeup springs. The plastic bearing materials used for the joints of this invention are sufficiently deformable to flow over the rim end of the stud head and into the recess of the socket closure plate, but are still rigid enough to maintain fixed turning centers to avoid looseness or mushiness in transmitting the steering action.

Although minor modifications might be suggested by those versed in the art, it should be understood that I wish to embody within the scope of the patent granted hereon, all such modifications as reasonably and properly come within the scope of my contribution to the art.

I claim as my invention:

1. A pin joint comprising a socket having a tapered bore converging from an open bottom to an apertured radial end wall, a pin having a shank extending freely through the aperture of said radial end wall and a head in said bore, said head having a fragmental spherical portion diverging from the shank to a hollow cylindrical end portion terminating in an annular double beveled rim, said rim having an outwardly flared mouth and an inwardly curved periphery converging to the mouth, a high density linear ethylene copolymer bearing block with an open ended cavity snugly receiving the pin head, a tapered side wall press fitted into the socket bore, a small end wall bottomed on the radial end wall of the socket receiving the stud shank therethrough and a large end wall in the socket adjacent the rim of the head, a high density linear ethylene copolymer compression plug in the hollow end of the head extending therefrom beyond said rim, a concave disk closing the bottom of the socket and axially loading and deforming the plug and bearing into conformity therewith and with the head of the pin, said bearing having a deformed inturned lip between the curved periphery of the head of the rim and the closure disk, and said plug having a deformed outturned bead between the outwardly flared mouth of the head of the pin and the disk, and lubricant trapped by said deformed lip and bead between the plug and head of the pin and between the head and bearing.

2. A pivot joint adapted for steering linkages and the like which comprises a stud having a generally cylindrical shank with a ball-shaped end having a hollow cylinderical extension terminating in a double beveled rim, a rigid deformable plastic bearing block enveloping said head, terminating adjacent the rim end thereof and receiving the shank freely therethrough, a socket receiving the bearing block in mated engagement, a closure disk for the socket, a rigid compressible plastic compression plug bottomed in the hollow end of the stud head and on the closure disk, and means axially loading the closure disk in the socket effective to deform the bearing and plug into conformity with the disk and socket and to flow plug and bearing material over the double beveled rim end of the head.

3. A lubricated sealed pin joint adapted for steering linkages and the like to provide a fixed turning center while accommodating high load deflection for misalignments which comprises a pin having an enlarged head on the end thereof defining a diverging external bearing surface accommodating rotation of the pin about its own axis and an axial recess in the end of the head, said end of the head having a rim surrounding the recess, a plastic bearing block enveloping said head in mated conformity therewith and extending beyond said rim, a compression plug bottomed in said recess and extending beyond the end of the head, a socket receiving said bearing block in enveloping relation therewith, a closure disk for said socket axially loading the compression plug and bearing block while simultaneously deforming the bearing block and plug into conformity with both the disk and the head and flowing plug and bearing block materials over said rim of the head, and lubricant trapped between the plug and head and between the head and bearing block by the deformed portions of the plug and bearing block.

4. A joint adapted to transmit endwise movement in a linkage while accommodating misalignment of the link parts under heavy load which comprises a pin having an enlarged head on the end thereof providing a bearing surface accommodating rotation of the pin about its own axis and an axial recess in the end of the head surrounded by a rim, a socket having an aperture receiving the pin freely therethrough and a chamber receiving the head of the pin, a high density linear ethylene copolymer bearing block in the socket enveloping said head, a high density liner ethylene copolymer plug in said axial recess of the head and projecting therefrom, a closure plate for the socket deforming said bearing block and plug and flowing the material thereof over the rim of the head and into conformity with said plate, and grease trapped between the head and bearing block and between the head and plug by the deformed portion thereof for facilitating rotation of the pin in the bearing block to maintain a constant turning torque for the joint.

References Cited

UNITED STATES PATENTS

| 2,083,718 | 6/1937 | Kull et al. | 287—90 |
| 3,047,319 | 7/1962 | Saylor | 287—90 |
| 3,226,142 | 12/1965 | Herbenar | 287—87 |

FOREIGN PATENTS

| 1,087,019 | 8/1960 | Germany. |
| 334,090 | 8/1930 | Great Britain. |
| 837,108 | 6/1960 | Great Britain. |

CARL W. TOMLIN, *Primary Examiner.*

A. V. KUNDRAT, *Assistant Examiner.*